Jan. 30, 1951 — J. F. A. KELL — 2,539,782
BEARING SLEEVE
Filed July 29, 1948
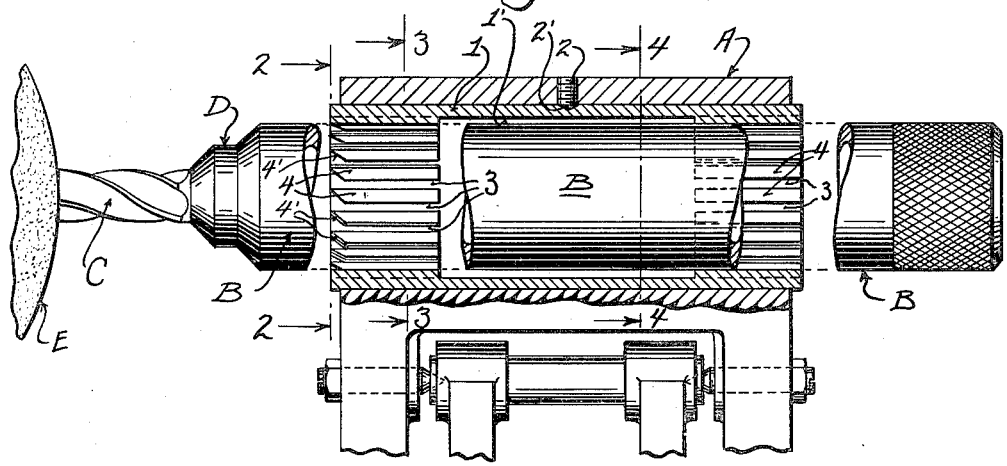
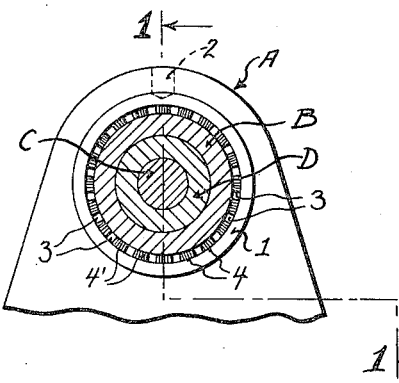
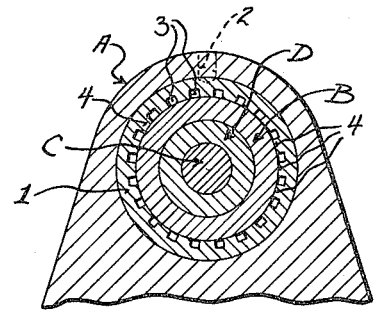
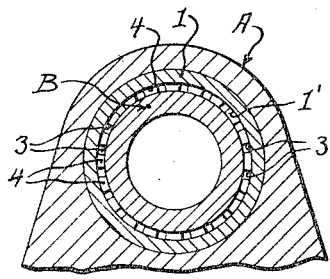
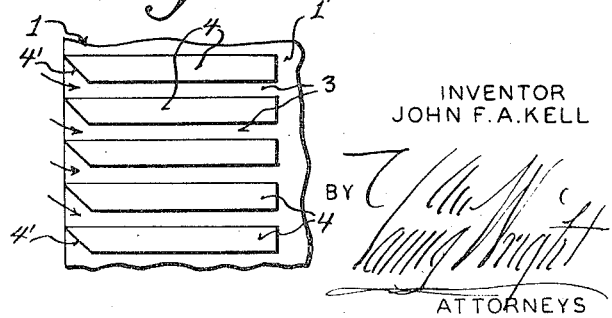
INVENTOR
JOHN F. A. KELL
ATTORNEYS Patented Jan. 30, 1951

2,539,782

UNITED STATES PATENT OFFICE 2,539,782

BEARING SLEEVE

John F. A. Kell, Milwaukee, Wis.

Application July 29, 1948, Serial No. 41,293

1 Claim. (Cl. 308—237)

My invention refers, in general, to tool grinders and particularly to the spindle carried bushing of the grinder head, such, for example, as disclosed in Patent No. 2,035,163. However, my improved bushing may be applied to any type of grinder other than that mentioned.

Practice has demonstrated that the fine grit thrown off from a tool being ground, is deposited upon the spindle and associated head and bushing, whereby the grit will seep in between the fine bearing surfaces of the bushing and spindle, resulting in choking or binding the movements of the spindle in the bushing. Thus the machine must be stopped and to remedy the defect, the bushing must be removed and cleaned, resulting in expenditure of time and costs.

The primary object of my invention is to provide a spindle bushing or sleeve, having end grooved bearings of various formation, connected by a bored clearance channel of greater diameter than said bearings, whereby the grit will enter the front clearance grooves and travel rearwardly through the channel and be discharged through said rear clearance grooves, without injury or contact with the bearing surfaces. Thus the life of the bushing is indefinitely extended.

With the above and other objects in view, which will appear as the description proceeds, the invention resides in the novel construction, combination and arrangement of parts, substantially as hereinafter described, and more particularly defined by the appended claim, it being understood that such changes in the precise embodiment of the herein disclosed invention may be made as come within the scope of the claim.

In the accompanying drawings is illustrated one complete example of the physical embodiment of the present invention constructed according to the best mode so far devised for the practical application of the principles thereof.

In the drawings:

Fig. 1 represents a sectional elevation of a grinder head having a bushing embodying the features of my invention, the section being indicated by line 1—1 of Fig. 2.

Fig. 2 is a cross sectional view through the front portion of the head and associated spindle, the section being indicated by line 2—2 of Fig. 1.

Fig. 3 is another cross sectional view upon a different plane, the section being indicated by line 3—3 of Fig. 1.

Fig. 4 is a further cross sectional view through the central portion of the head and sleeve, the section being indicated by line 4—4 of Fig. 1; and Fig. 5 is a diagrammatic flattened out fragmentary view of the front bearing surface of the bushing, the same being interrupted by longitudinal grooves to form ribs having beveled outer ends to develop angular mouths.

Referring by characters to the drawings, A indicates a grinder head, and B a spindle journaled therein, adapted to be manually rotated and longitudinally shifted back-and-forth. The front end of the spindle carries a tool C, secured therein by a chuck D, it being understood that the said tool may be of any desired nature and it is adapted to be ground by a wheel E, all of which elements are of standard type and form no part of my invention.

Mounted in the head A is a bearing sleeve 1, suitably secured by a bolt 2, in threaded union with the head and provided with a tapered end engaging a transversely disposed tapered seat 2' formed in the periphery of the sleeve.

The front and rear ends of the sleeve 1 are provided with spaced spindle bearing surfaces, which surfaces are formed with longitudinally disposed grooves 3, extending from end to end of said bearing surfaces. The grooves, thus developed, ribs 4, and as shown, the front set of bearing ribs, are provided with beveled ends 4', whereby angular mouths communicate with the longitudinal grooves, as shown.

While I have illustrated the front bearing surfaces provided with beveled ends, I may, without departing from the spirit of my invention, also provide the rear end bearing surface with similar beveled ends. The method of forming said beveled ends may be varied indefinitely, whereby they will serve as mouths for the introduction of grit into the grooves or gutters, which grit is deposited upon the surface of the spindle at the front end of the bushing.

The spaced and grooved bushing bearings are connected by a clearance channel 1', which channel is of greater diameter than the spindle B, whereby fine grit deposits are caused to travel through the grooves into the clearance channel, and from thence the said grit is discharged out through the rear bearing grooves, to thus positively eliminate grinding waste, from the bearing surfaces, which would otherwise readily choke the action of the spindle in the bearing between the spindle and the bushing, it being understood that said bearings must be of micromic accuracy.

It is also apparent, in some instances, I may dispense with beveling or pointing the ends of the bearing ribs.

While I have illustrated and described the bearing grooves as extending longitudinally or paralleling the axis of the spindle, I may, in some instances, provide spiral grooves, without departing from the spirit of my invention.

I claim:

In a rotary and reciprocative manually actuated grinder spindle adapted to collect grit thereon; a fixed bushing for the spindle having end bearings for said spindle and a channel of greater diameter than the spindle, said end bearings having bearing faces, the bearing faces being interrupted by a series of longitudinally disposed grooves forming ribs, the bottom of said grooves being of the same diameter as the bushing channel, whereby grit from the spindle entering one series of grooves to the channel will be entirely expelled from said channel along the bottom surface of the opposite series of grooves.

JOHN F. A. KELL.

REFERENCES CITED

The following references are of record in the file of this patent:

UNITED STATES PATENTS

| Number | Name | Date |
|---|---|---|
| 268,552 | Senderling | Dec. 5, 1882 |